May 10, 1938.  J. W. HERNLUND  2,117,165
DUPLICATING MACHINE
Filed Oct. 14, 1935    11 Sheets-Sheet 1

Inventor:
John W. Hernlund
By Zabel Carlson & Wells
Attorneys

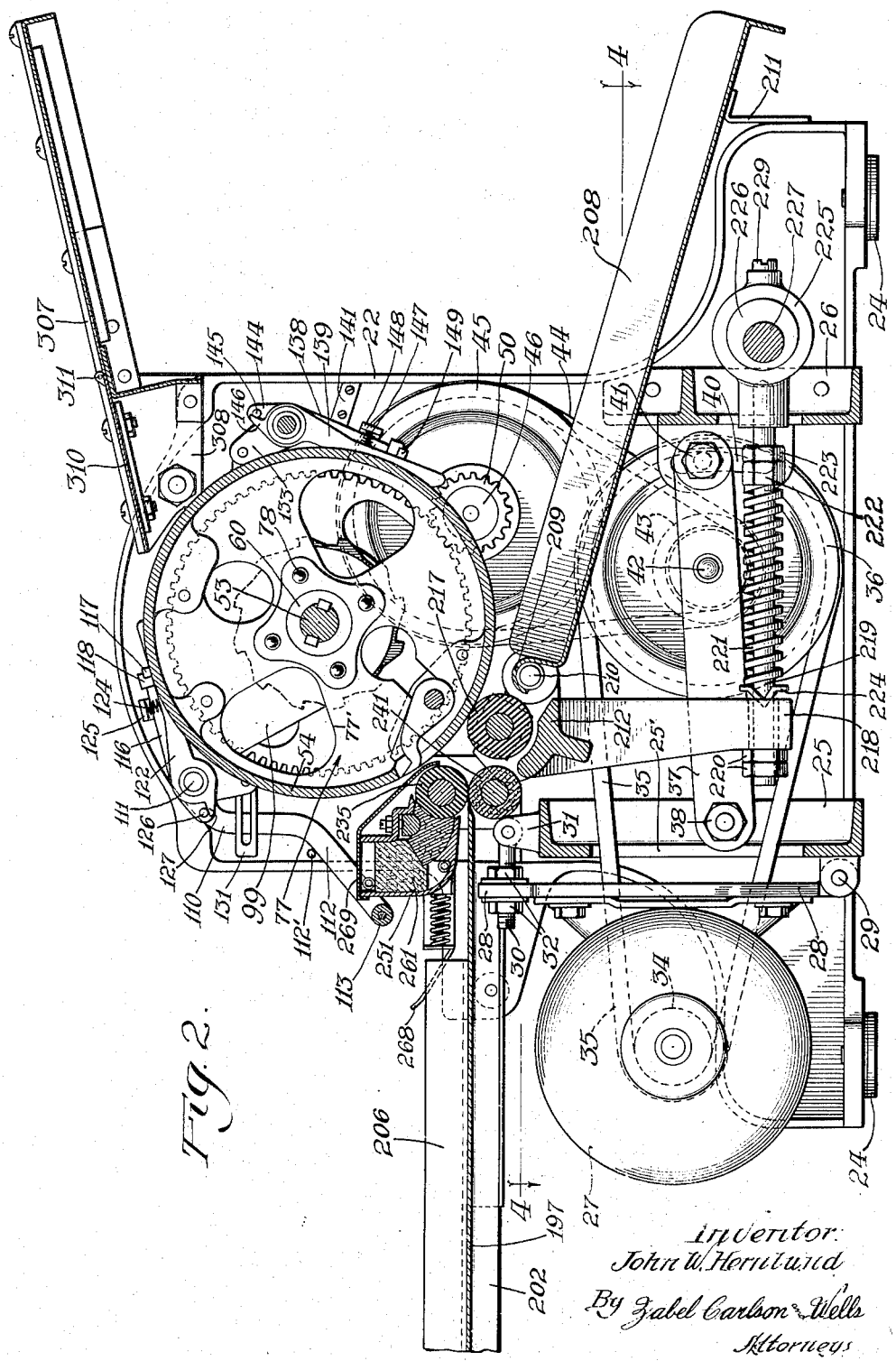

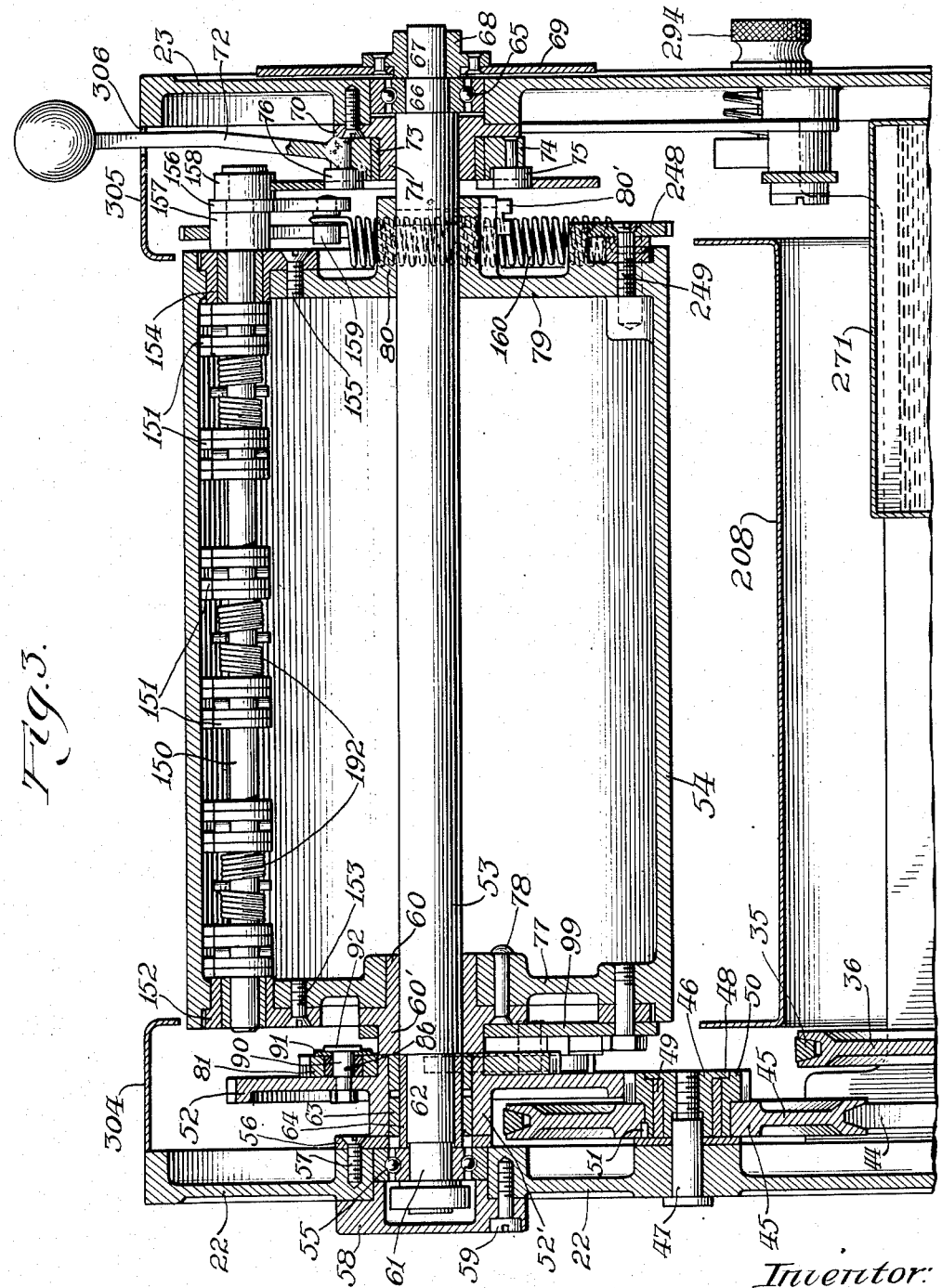

May 10, 1938.  J. W. HERNLUND  2,117,165
DUPLICATING MACHINE.
Filed Oct. 14, 1935  11 Sheets-Sheet 4
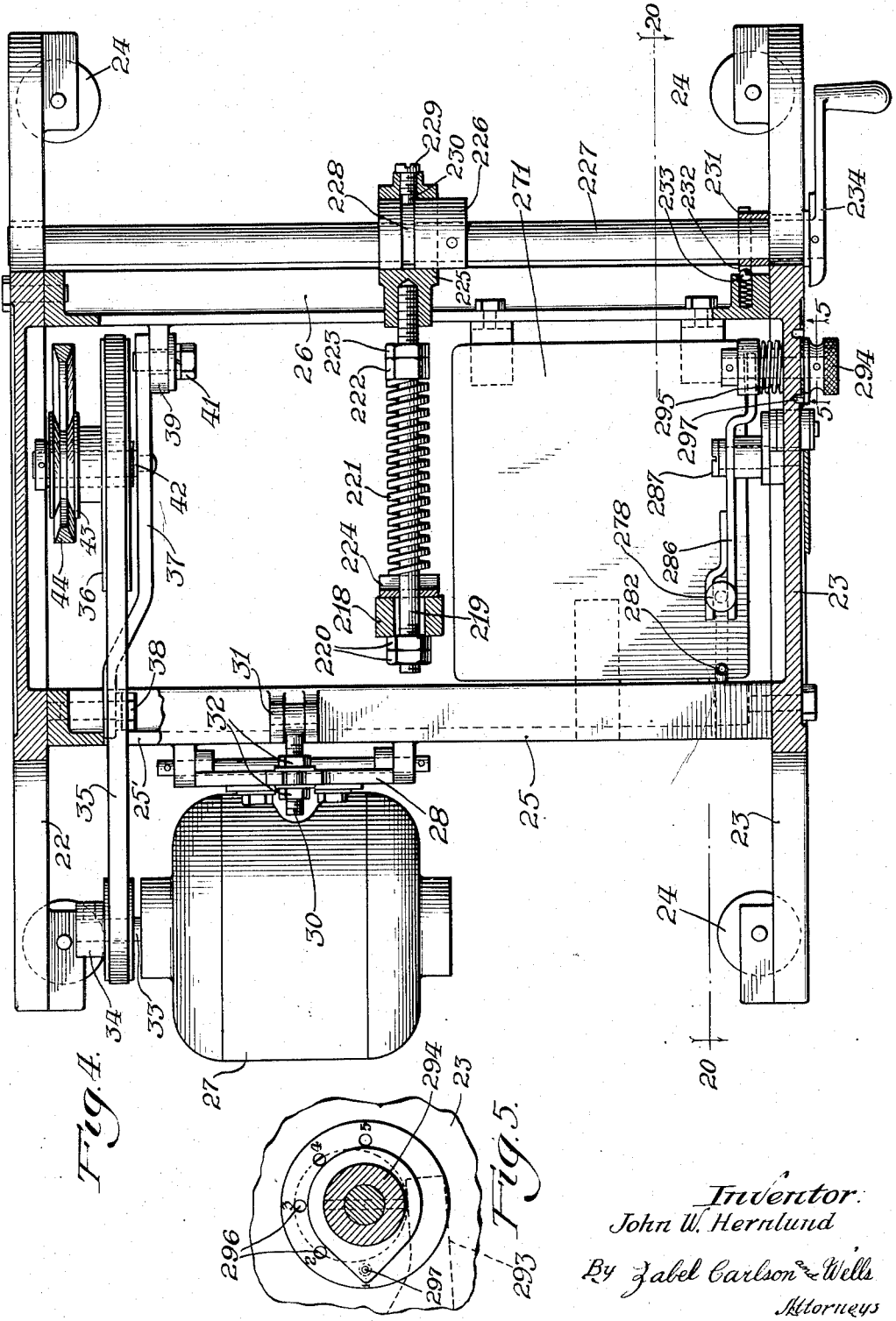
Inventor:
John W. Hernlund
By Zabel Carlson & Wells
Attorneys May 10, 1938.   J. W. HERNLUND   2,117,165
DUPLICATING MACHINE
Filed Oct. 14, 1935   11 Sheets-Sheet 5

Inventor:
John W. Hernlund
By Zabel Carlson & Wells
Attorneys

May 10, 1938.  J. W. HERNLUND  2,117,165
DUPLICATING MACHINE
Filed Oct. 14, 1935  11 Sheets-Sheet 7
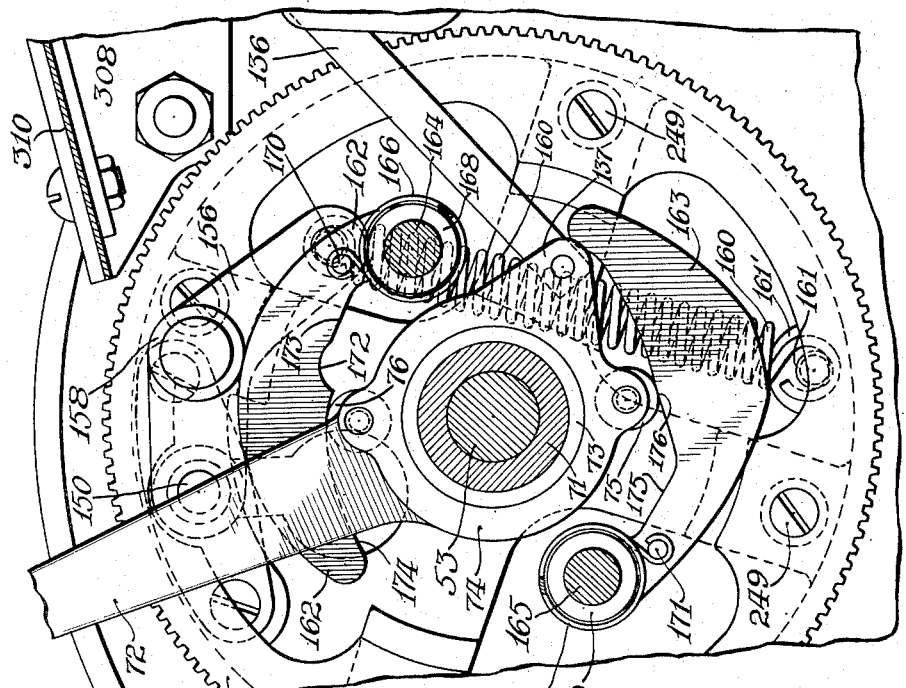
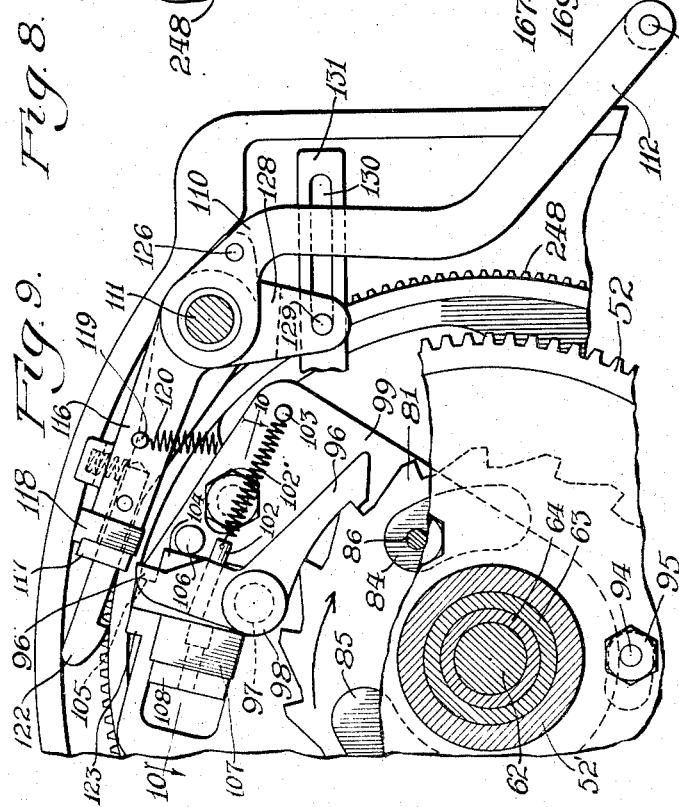
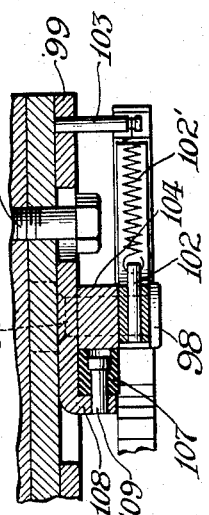
Inventor:
John W. Hernlund
By Zabel Carlson Wells
Attorneys

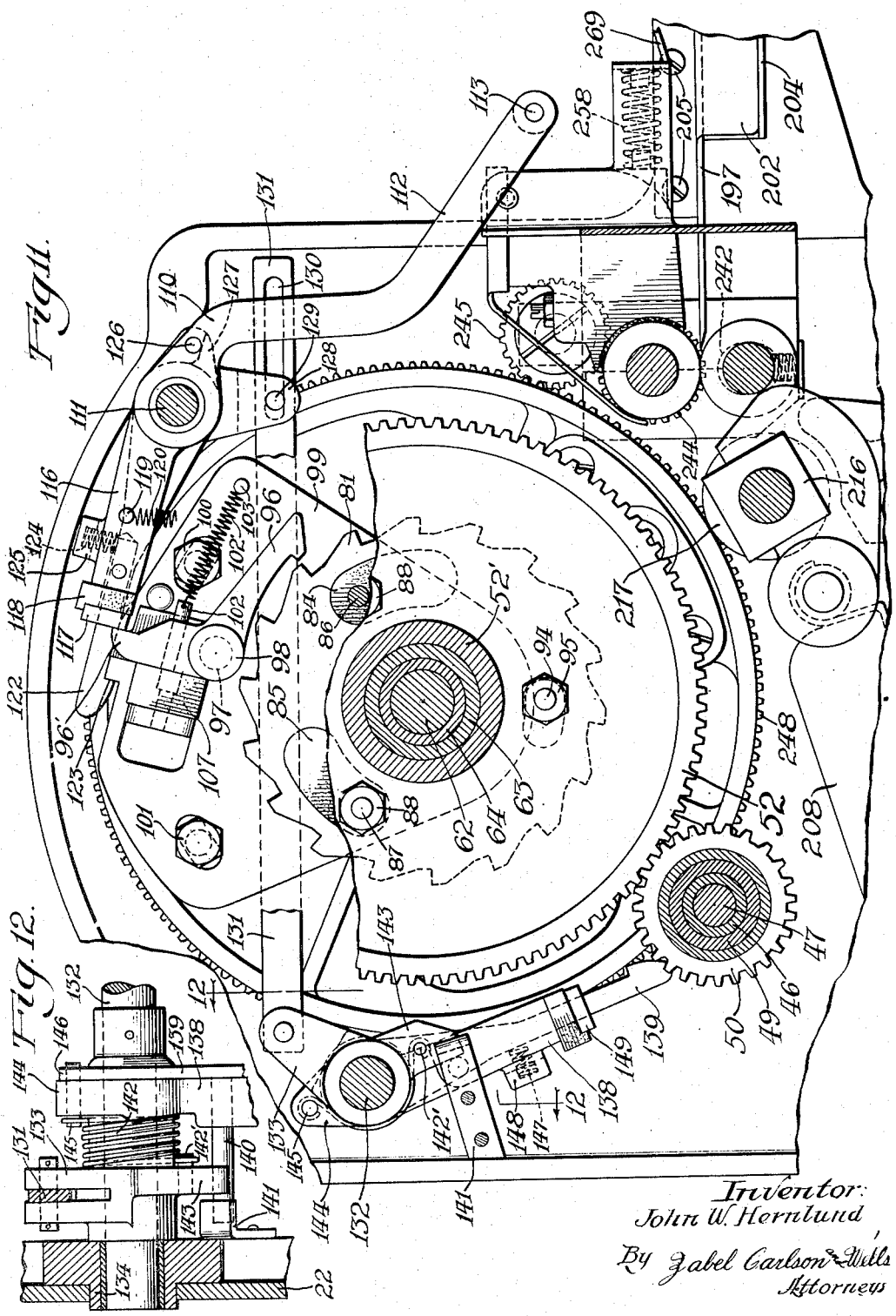

May 10, 1938.   J. W. HERNLUND   2,117,165
DUPLICATING MACHINE
Filed Oct. 14, 1935   11 Sheets-Sheet 9

Inventor:
John W. Hernlund
By Zabel Carlson & Wells
Attorneys

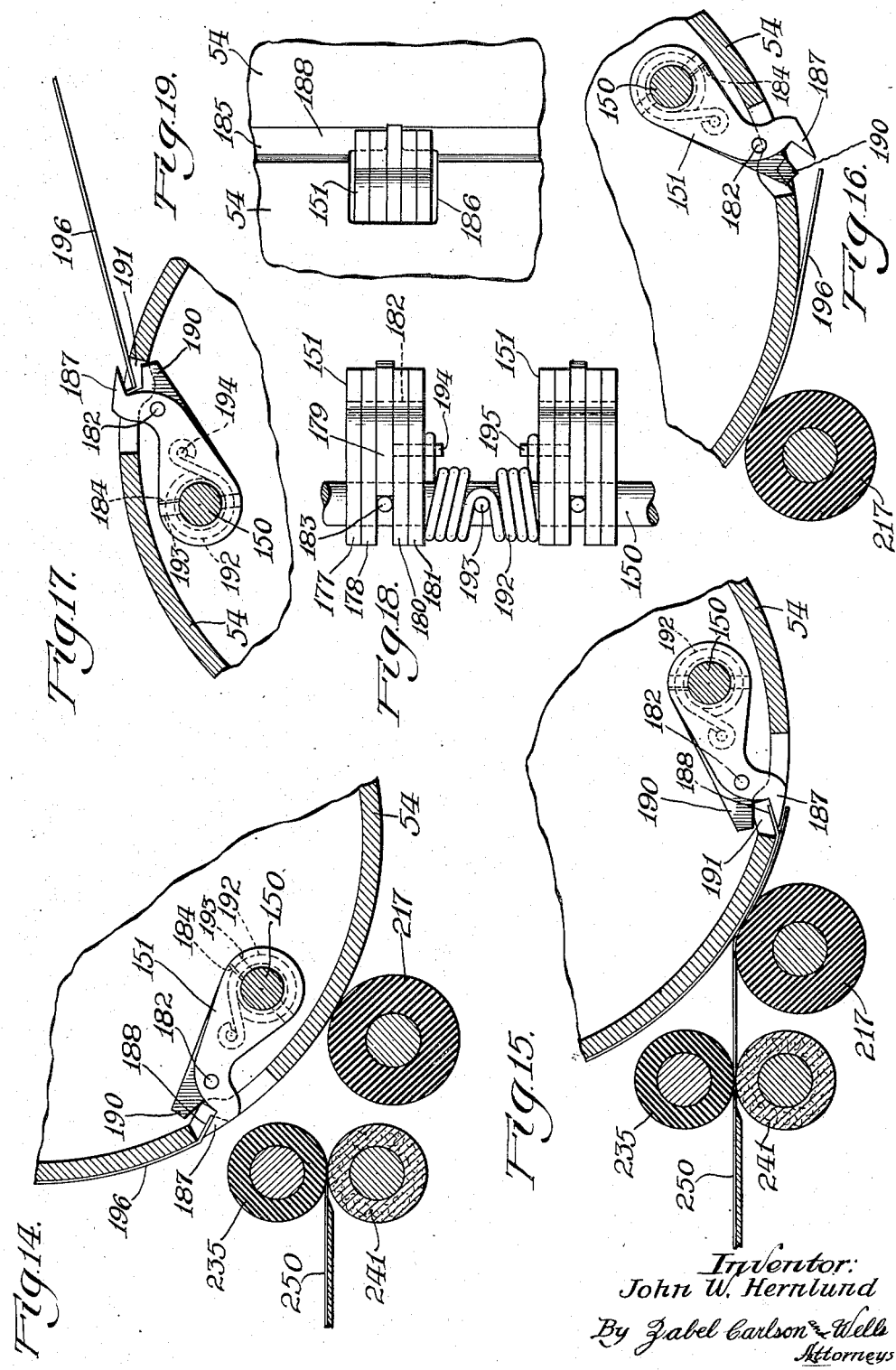

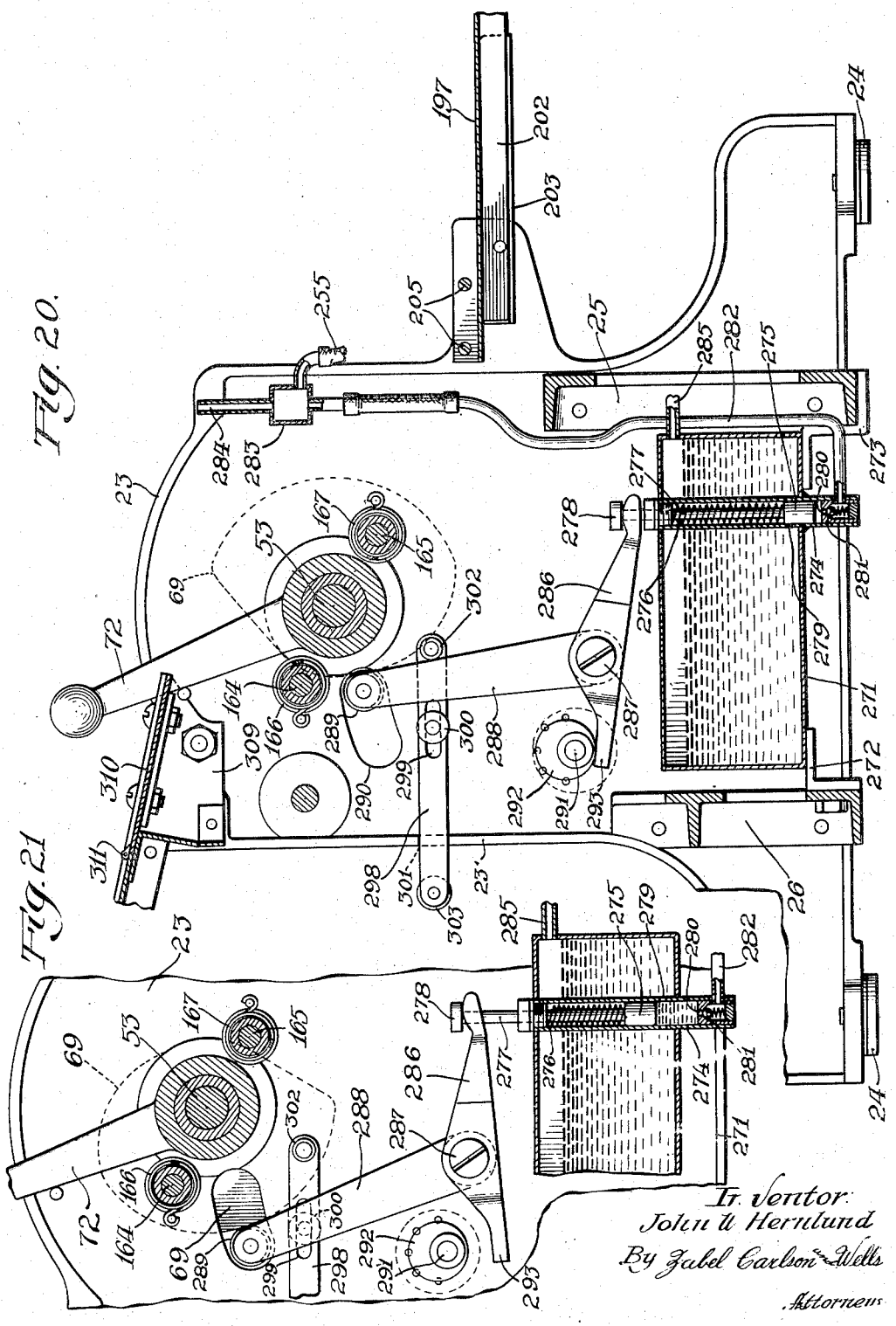

Patented May 10, 1938

2,117,165

UNITED STATES PATENT OFFICE 2,117,165

DUPLICATING MACHINE

John W. Hernlund, Western Springs, Ill., assignor to Ditto, Incorporated, Chicago, Ill., a corporation of West Virginia Application October 14, 1935, Serial No. 44,911

19 Claims. (Cl. 101—132)

This invention relates to duplicating machines and is particularly adapted to be embodied in a duplicating machine of the type wherein master sheets of paper are employed and the copy sheets are moistened with a suitable solvent for the ink or carbon on the master sheet, each copy sheet being brought in turn into contact with the master sheet while its surface is moistened so that the data on the master sheet will be transferred to the copy sheet.

The master sheets have the data to be duplicated formed thereon in reverse so that, when a portion of the carbon or ink is dissolved off and transferred to the moistened surface of the copy sheet, it will appear in correct readable form. In practice, some volatile solvent such as alcohol is employed, and this solvent is applied to the copy sheets as they approach the master sheet so that the master sheet and copy sheet may be placed in intimate contact before the solvent has time to evaporate.

One form of the invention is embodied in a machine of the type described which comprises a rotary drum having means for clamping master sheets thereto and for discharging them therefrom. The copy sheets may be advanced to the drum in any suitable manner, and a platen roller is adapted to press the copy sheets against the master sheet during the duplicating operation. Means comprising combined moistening and feeding rollers are provided for advancing the copy sheets to the platen roller and drum and at the same time moistening one surface of the copy sheets for application to the master sheet upon the drum.

The improved machine also comprises power driven means for rotating the drum, and control mechanism whereby the operator may connect the power driven means to the drum for successive rotations of the drum in making copies.

Means are also provided whereby the operator may quickly connect the drum to the power driven means for a partial rotation and stop the drum in a different position for insertion of fresh master sheets.

In connection with this last named means, the machine is also provided with mechanism for discharging a used master sheet and bringing the gripper mechanism on the drum into open position when the drum is stopped to receive a fresh master sheet.

The improved machine also comprises moistening means which operates in conjunction with the rotation of the drum to feed a measured amount of solvent or moistening fluid into position to be applied by the moistening roller to the copy sheets.

The machine further comprises certain improvements in gripping mechanism for gripping master sheets on the drum whereby the relative thickness or unevenness of master sheet paper does not affect the securing of the master sheet to the drum.

Other features and advantages of the invention will become apparent as the following description progresses, reference being had to the accompanying drawings wherein—

Fig. 2 is a sectional view taken on the line 2—2 of Fig. 1;

Fig. 3 is a sectional view taken on the line 3—3 of Fig. 1;

Fig. 4 is a sectional view taken on the line 4—4 of Fig. 2;

Fig. 5 is an enlarged detail sectional view taken on the line 5—5 of Fig. 4;

Fig. 8 is a fragmentary sectional view on the line 6—6 of Fig. 1 showing a further position of the parts;

Fig. 9 is a fragmentary sectional view taken on the line 9—9 of Fig. 1;

Fig. 10 is a fragmentary sectional view taken on the line 10—10 of Fig. 9;

Fig. 11 is a sectional view on the line 9—9 of Fig. 1 showing a different position of the parts from that shown in Fig. 9;

Fig. 12 is an enlarged sectional view taken on the line 12—12 of Fig. 11;

Fig. 14 is a fragmentary sectional view through the drum and the feeding rollers with the moistener parts left out for clearness;

Fig. 15 is a sectional view like Fig. 14 showing a changed position of the drum;

Fig. 16 is a sectional view like Fig. 14 showing a further position of the drum when the master sheet is being discharged;

Fig. 17 is another fragmentary section through the drum showing the drum in the master sheet feeding position;

Fig. 18 is a detail view of the gripper mechanism;

Fig. 19 is a fragmentary plan view of the drum surface showing the gripper therein;

Fig. 20 is a sectional view on the line 20—20 of Fig. 4;

Fig. 21 is a fragmentary sectional view on the line 20—20 of Fig. 4 showing a changed position of the mechanism.

Figure 1:
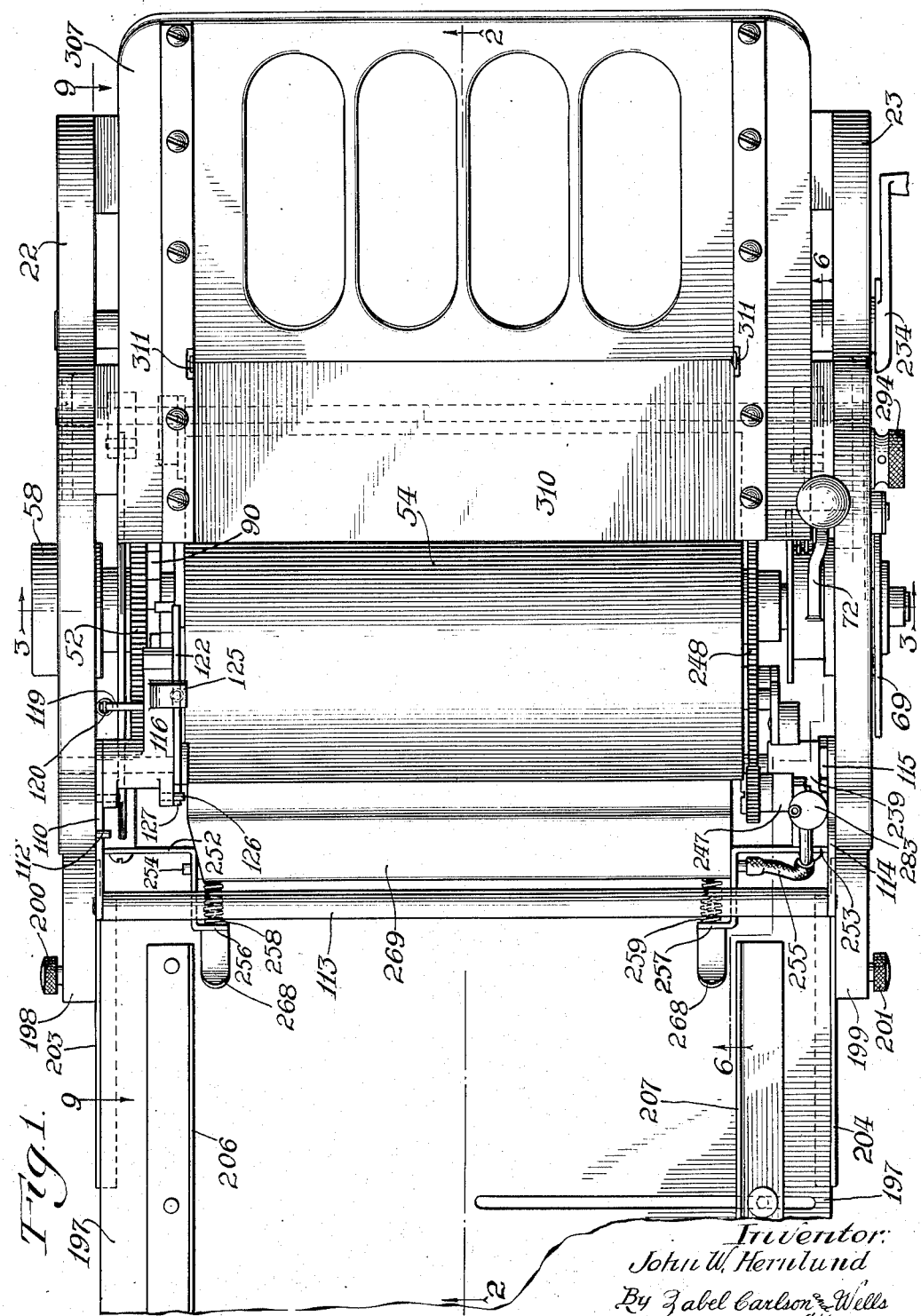
Fig. 1 is a plan view of a duplicating machine which embodies the invention.

Referring now to the drawings in which a preferred embodiment of the invention is shown, the reference characters 22 and 23 designate a pair of side frames adapted to rest upon any suitable support, the side frames 22 and 23 being provided with rubber feet 24 which rest upon this support. Interposed between the side frames 22 and 23 and rigidly secured thereto are brackets 25 and 26.

Bracket 25 provides a support for a drive motor 27. A supporting plate 28 to which motor 27 is bolted has one end pivoted at 29 to bracket 25 while at the upper end plate 28 is connected by means of a rod 30 to a lug 31 mounted on top of bracket 25. The rod 30 is pivoted to a lug 31 and passes through plate 28. Lock nuts 32 adjustable on the rod 30 operate to provide adjustment of plate 28 for a purpose which will presently appear. Motor 27 has a drive shaft 33 upon which a drive pulley 34 is secured. Pulley 34 drives a belt 35 which passes over a pulley 36. The pulley 36 is carried by a cross bar 37 secured to bracket 25 by means of a bolt 38. The other end of cross bar 37 is mounted upon a lug 39 projecting out from bracket 26 and provided with an elongated slot 40 (see Fig. 2) through which a screw bolt 41 extends, the screw bolt 41 being threaded into cross bar 37 so as to clamp the cross bar to lug 39. Pulley 36 is rotatable upon a shaft 42 which is fixed to the cross bar 37, and a second pulley 43 is fixed to the pulley 36. A second belt 44 connects pulley 43 with a pulley 45. Pulley 45 is supported upon a stub shaft 46 fixed to the side frame 22 by a screw 47. Stub shaft 46 has a flange 48 at the outer end thereof. A bushing 49 surrounds the stub shaft 46, and a pinion 50 is rotatable on said bushing. Pinion 50 forms a hub for pulley 45 and is keyed thereto as is indicated at 51 (see Fig. 3). Pinion 50 meshes with a gear wheel 52 journalled for rotation upon a drum shaft 53 which carries a duplicating drum 54.

Before proceeding further with the description of the drum 54 and the cooperating parts, the purpose of the adjustment provided by rod 30 for plate 28 will be described.

Should it be desirable to tighten belt 35, this can be accomplished readily by adjusting the nuts 32 upon rod 30 to swing the plate 28 about its pivot 29 thus moving motor 27 with respect to pulley 36. It will be noted that belt 35 passes through a slot or opening 25' provided in the bracket 25. When it is desired to adjust the tension of belt 44 which connects pulley 43 with pulley 45, this adjustment is taken care of by moving the cross bar 37 with respect to lug 39 on bracket 26 and clamping it in the desired position by means of screw bolt 41.

The mounting of drum shaft 53 and drum 54, as shown best in Fig. 3, will now be described.

Shaft 53 is mounted in frame 22 by means of a suitable ball bearing 55. This bearing is held in place on the one side by a plate 56 secured to side frame 22 by suitable means such as a screw 57, and on the outside a cap 58 fits over the outer end of shaft 53 and is held in place by means of a screw 59. A hub 60 for supporting one end of the drum 54 is keyed to shaft 53. Between the hub 60 and a reduced section 61 of shaft 53, which section is mounted in the ball bearing 55, shaft 53 is provided with an intermediate section 62 on which the gear 52 is rotatably mounted. Bushings 63 and 64 are interposed between the section 62 and a hub 52' of gear 52. At the other end, shaft 53 is mounted in side frame 23 by means of a suitable ball bearing 65 which bearing surrounds a reduced section 66 of the shaft 53. Secured to the outer end 67 of shaft 53 is a hub 68 for a cam 69 which lies outside of side frame 23. A collar 70 is fixed to the frame 23 on the inner surface thereof around shaft 53. This collar has a reduced bearing portion 71 on which a hub 74 of a hand lever 72 is pivotally mounted, a bushing 73 being interposed between the hub 74 and the reduced portion 71 of collar 70. The hub 74 carries a pair of rollers 75 and 76, the purpose of which will be more clearly explained hereinafter.

The hub 60 serves as a mounting for one end plate 77 of the drum 54. The end plate 77 is secured to the hub 60 by rivets 78. The hub 60 is of cast steel to provide a strong connection between the shaft 53 and the end plate 77. At the other end of the drum 54, an end plate 79 has a hub 80 fitting on the shaft 53. A set screw 80' secures the hub 80 to the shaft 53 and prevents endwise movement of the drum 54 on the shaft 53. The end plates 77 and 79 are cast integral with the drum 54. The end plates are provided with openings such as 77' and 79' through which sand cores used in casting the drums may be removed. The metal used for the drum 54 and the end plates 77 and 79 is preferably aluminum.

The drum 54 is connected to the continuously rotating gear wheel 52 by the mechanism shown best in Figs. 3 and 9 to 13, inclusive. This mechanism comprises a ratchet wheel 81 mounted on the gear wheel 52. The ratchet wheel 81 has a pair of openings 82 and 83 therein, and rubber cushioning members 84 and 85 fill these openings. A pair of bolts 86 and 87 pass through the gear 52 and the cushioning members 84 and 85, and are secured to the gear 52 by nuts 88 and 89. Each bolt has an enlarged portion 90 (see Fig. 3) passing through the rubber cushioning member and providing a shoulder abutting the gear wheel 52. A cover plate 91 for the cushioning member is held in place by a head 92 on the bolt. The openings 82 and 83 are spaced about 120 degrees apart around the ratchet wheel 81, and a smaller opening 93 is provided in the ratchet wheel about 120 degrees from the openings 82 and 83. A bolt 94 passes through this opening and has a nut 95 thereon. This mounting of the ratchet wheel 81 on the gear wheel 52 permits a limited amount of rotation of the ratchet wheel on the gear wheel to absorb the shock of connecting the gear wheel to the drum 54.

The connecting mechanism for connecting the ratchet wheel 81 to the drum 54 comprises a pawl 96 pivoted on a pin 97 which is secured to a plate 99 and has a head 98 thereon. The plate 99 fits over a reduced portion 60' of hub 60 (see Fig. 3) and is adjustably secured to the end plate 77 of the drum 54 by bolts 100 and 101 passing through elongated slots in the plate 99 and threaded into the end plate 77. By loosening the bolts 100 and 101, the plate 99 and the pawl 96 may be turned slightly about the hub 60 for adjusting the position of the pawl 96 with respect to the drum 54. A pin 102 on the pawl 96 is connected to a pin 103 on the plate 99 by a spring 102' to swing the pawl 96 into engagement with the ratchet wheel 81. Beneath the pawl 96 and pivoted on the pin 97 is a block 104. This block 104 has a shoulder 105 at its outer end which is used in locking the drum 54 in place as will be presently explained. On one side, the block 104 engages a stop pin 106 on the plate 99, and on the other side the block 104 engages a rubber cushion 107 which is secured to a lug 108 struck up from the plate 99. A pin 109 secures the rubber cushion 107 to the lug 108. The pawl 96 and the block 104 are not connected to each other, but both of them are rotatable on the pin 97.

There are two control mechanisms for effecting release of the drum 54 from driving connection with the ratchet wheel 81 on the drive gear 52. One of these mechanisms is operable to stop the drum in position for feeding a new copy sheet thereto, while the other mechanism is operable to stop the drum in position for applying a new master sheet thereto.

The first mentioned mechanism will be described first. This mechanism comprises a control lever 110 pivoted on a stub shaft 111 which shaft is secured in the side frame 22. The control lever 110 has a portion 112 extending downwardly and forwardly and supporting at its free end one end of an operating bar 113. This operating bar is supported at its other end by an arm 114 (see Fig. 1) which is pivoted on the side frame 23 at 115. A stop pin 112' on the side frame 22 limits the upward movement of the lever 110. The lever 110 has a trip arm 116 extending toward the drum, and between the end of the drum and side frame 22, this trip arm is provided at its inner end with a yielding abutment 117 for engaging a projection 96' provided on the pawl 96. The abutment 117 is urged outwardly by a rubber cushion 118. The trip arm 116 has a pin 119 thereon, and a spring 120 connects this pin with a pin 121 mounted upon the side frame 22. This spring 120 tends to pull trip arm 116 down so as to bring the abutment 117 into the path of the projection 96' on the pawl 96. In the position shown in Fig. 9, it will be noted that abutment 117 has been raised above the projection 96' so that the pawl 96 has engaged one of the teeth on the ratchet wheel 81, thus coupling the drum 54 to the ratchet wheel 81 for rotation. The direction of rotation of ratchet wheel 81 is indicated by the arrow in Fig. 9. In the position shown in Fig. 9, the pawl 96 has just been released from the abutment 117. When the ratchet wheel 81 has rotated to the position shown in Fig. 11, the projection 96' on pawl 96 is engaged by the abutment 117, as shown in Fig. 11, to release the pawl 96 from the ratchet wheel 81. Abutment 117, in the position shown in Fig. 11, also engages shoulder 105 on the block 104 to thus positively stop the drum 54 against further rotation.

To avoid movement of the drum in a reverse direction, a latch arm 122 which is also pivoted on shaft 111 drops over a shoulder 123 provided in the outer edge of plate 99. The latch arm 122 is pressed toward the plate 99 by a spring 124 interposed between the top of the latch arm and a lug 125 which extends over from the trip arm 116. In order to lift the latch 122 and to avoid its dropping down too far when the plate 99 moves out from beneath it, the lever 110 carries a pin 126 which engages a projecting lug 127 on the latch arm 122.

Thus the operation of the control lever 110 by pressing down upon the bar 113 lifts the trip arm 116 to release the pawl 96 from the abutment 117, and at the same time the pin 126 presses down on the projection 127 to lift the latch arm 122 away from the shoulder 123 on the plate 99. The latch arm 122 is lifted by the plate 99 against the pressure of the spring 124 as the drum approaches stop position as shown in Fig. 11, but this does not lift the trip arm 116 so it remains in position to engage the projection 96' and the shoulder 105.

The operation just described is practically the same as that disclosed in the prior application of Robert F. Morrison and Merritt G. Stewart, Serial No. 10,214, filed March 9, 1935.

Integral with the lever 110 where it is mounted on the shaft 111, there is provided a downwardly extending bifurcated arm 128 which has a pin 129 passing through an elongated slot 130 in a link 131. The link 131 connects to the second control mechanism hereinbefore referred to and shown in Fig. 11. This second control mechanism is mounted upon a shaft 132 and is connected by a bifurcated arm 133 with the link 131. The shaft 132 is journalled at one end in the end frame 22 by means of a bearing 134 shown most clearly in Fig. 12. This shaft extends across the machine and is journalled at its other end in a similar fashion in the side frame 23. Adjacent the frame 23, the shaft 132 is provided with a bifurcated arm 135 (see Fig. 6) which arm is connected by a link 136 to a bifurcated arm 137 on the hub 74 of the hand lever 72. Thus by rocking hand lever 72, the shaft 132 and the arm 133 may be rocked from the position shown in Fig. 6 through the positions shown in Figs. 7 and 11 to that shown in Fig. 13.

Pivoted on the shaft 132 there is a second trip arm 138 and a latch arm 139, substantially duplicates in their structure and in their relation to each other of the trip arm 116 and the latch arm 122, respectively. A pin 140 on the trip arm 138 is adapted to engage a stop plate 141 which is fixed on the side frame 22 and has a turned up end portion for engaging the stop pin 140. This pin acts to limit the movement of the trip arm 138 and through it the movement of the latch arm 139 toward the axis of the drum 54. The arm 138 is connected to the shaft 132 by means of a coiled spring 142 which at one end is connected to a pin 142' on a projection 143 on the hub of bifurcated arm 133 and at the other end is connected to a projection 144 which extends from the hub of the trip arm 138 on the opposite side of the shaft 132 from the arm 138. A pin 145 secures one end of the spring to the projection 144 and also extends through the projection 144 to provide a stop pin for engaging a projection 146 upon the end of the latch arm 139. The latch arm 139 is pushed toward its position to engage the notch 123 on the plate 99 by a spring 147 interposed between the back side of the arm 139 and a lug 148 on the trip arm 138.

Figure 13:
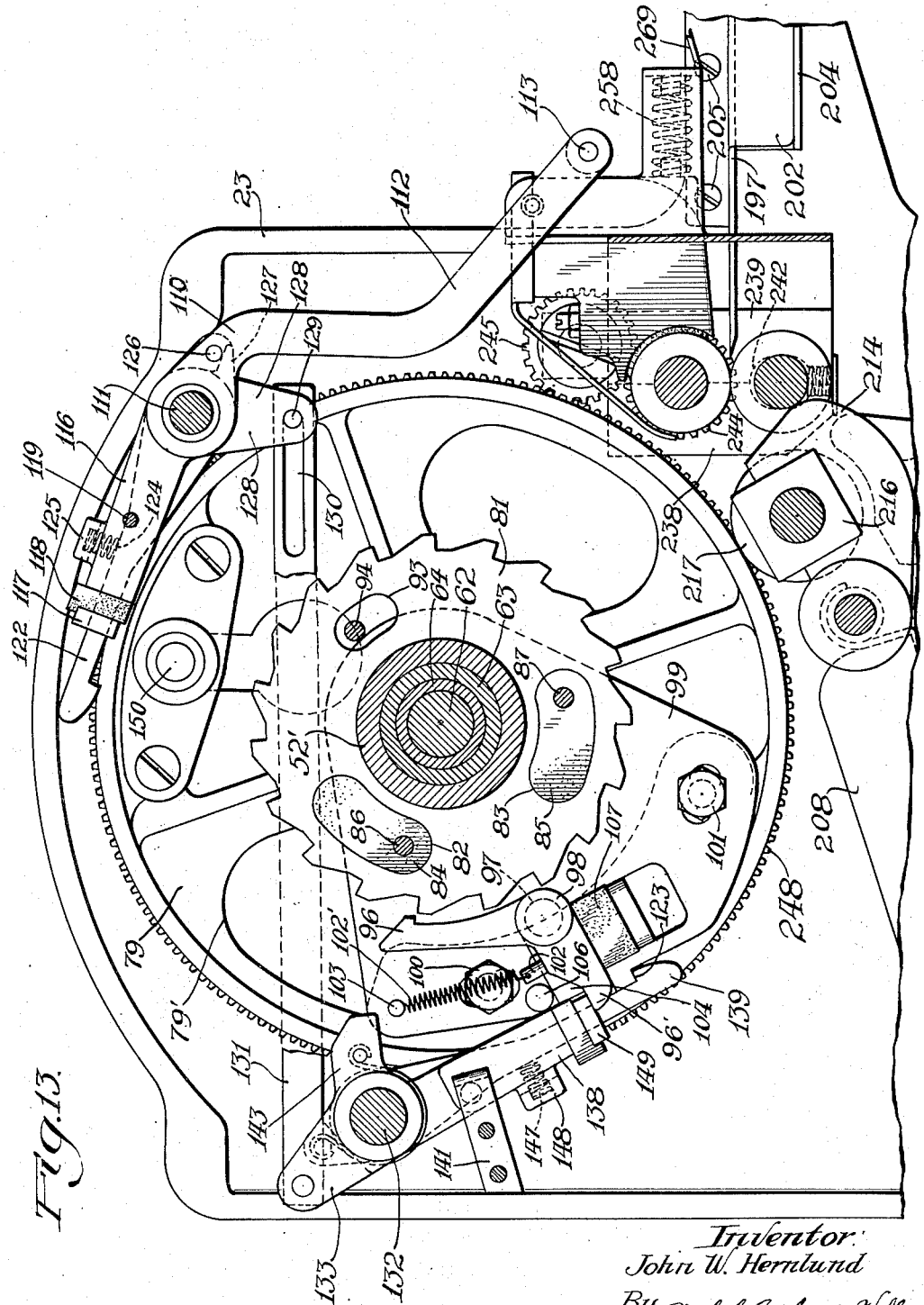
Fig. 13 is a sectional view taken on the line 9—9 of Fig. 1 showing a further position of the parts.

It is believed to be evident that, when the shaft 132 is rotated from the position shown in Fig. 11 to that shown in Fig. 13, the link 131 will draw the bifurcated arm 128 inward to cause the trip arm 116 and the latch arm 122 to be moved out of the way of the plate 99, the projection 96', and the block 104, respectively. At the same time, the tightening of the spring 142 will move the latch arm 138 into the position shown in Fig. 13 where it will be in the path of the projection 96' and of the block 104 so as to stop the drum with the pawl projection 96' engaging a yielding abutment 149 on the end of the trip arm 138 and with the latch arm 139 engaging the shoulder 123 on the plate 99. Of course, when the shaft 132 is rotated in the opposite direction, the arms 138 and 139 will be lifted away from the locking position by the release of the spring 142 and by engagement of the projection 143 with the pin 140.

The shaft 132, as hereinbefore described, is operated by movement of hand lever 72 which also controls the gripper mechanism for gripping master sheets to the drum 54. The gripper mechanism and its operative connection to the hand lever are best shown by reference to Figs. 3, 6, 7, and 14 to 19 inclusive.

Referring now to Fig. 3, it will be noted that there is a shaft 150 extending lengthwise of the drum 54 and carrying a plurality of gripper units 151. The shaft 150 is journalled at the left hand end of Fig. 3 in a bearing member 152 which is secured by means of screws 153 to the end plate 77 of the drum. A bearing member 154 secured to the end plate 79 of the drum by means of screws 155 supports the other end of shaft 150. The shaft 150 is moved to operate the gripper units 151 by means of the lever 72.

The mechanism for rocking shaft 150 to actuate the gripper units is shown best in Figs. 3, 6, 7, and 8, and comprises an arm 156 having a hub 157 fixed on the shaft 150 and carrying a roller 158. At its free end, the arm 156 has a pin 159 secured to a coiled spring 160, the other end of the coiled spring 160 being secured to a pin 161 mounted on a lug 161' cast on the inner surface of the drum. The roller 158 on arm 156 is adapted to ride upon a pair of cam arms 162 and 163. These cam arms 162 and 163 are mounted on stub shafts 164 and 165, respectively, the stub shafts 164 and 165 being fixed to the end frame 23 of the machine. Coiled springs 166 and 167 are coiled around hubs 168 and 169, respectively, of the cam arms 162 and 163 and are connected to these cam arms as indicated at 170 and 171 so that they normally tend to swing the cam arms 162 and 163 inward toward the axis of the drum. The cam arms 162 and 163 provide cam surfaces on their inner edges for engagement with the rollers 75 and 76 which are carried by the hub 74 of the lever 72. The roller 76 engages the inner edge of the arm 162, and this arm is provided with a recess at 172 which separates a portion 173 of the inner edge of the cam arm 162 from a portion 174. When roller 76 is riding on the portion 173 of the cam arm, the cam arm is in its inoperative or resting position and does not engage the roller 158 on the arm 156 to actuate the gripper shaft 150. If the lever 72 is moved from the position shown in Fig. 6 to the position shown in Fig. 8, then roller 76 moves across the depression 172 and engages the surface 174 on the cam arm 162 to move the outer cam surface of the cam arm 162 out into the path of the roller 158 thus to move the arm 156 and the shaft 150 against the tension of the spring 160.

Similarly, when the roller 75 engages a portion 175 on the inner surface of the cam arm 163, this cam arm is in its innermost or resting position and out of the path of the roller 158. This is the position shown in Fig. 6 and corresponds to operating position for making copies with the machine. When the roller 75 is moved by moving the lever 72 into the position shown in Fig. 7, then the roller 75 engages a surface 176 on the cam arm 163 and moves the cam arm 163 out into the path of the roller 158 to move the arm 156 out into the position shown in Fig. 7, thus causing a corresponding angular movement of the shaft 150.

Figure 6:
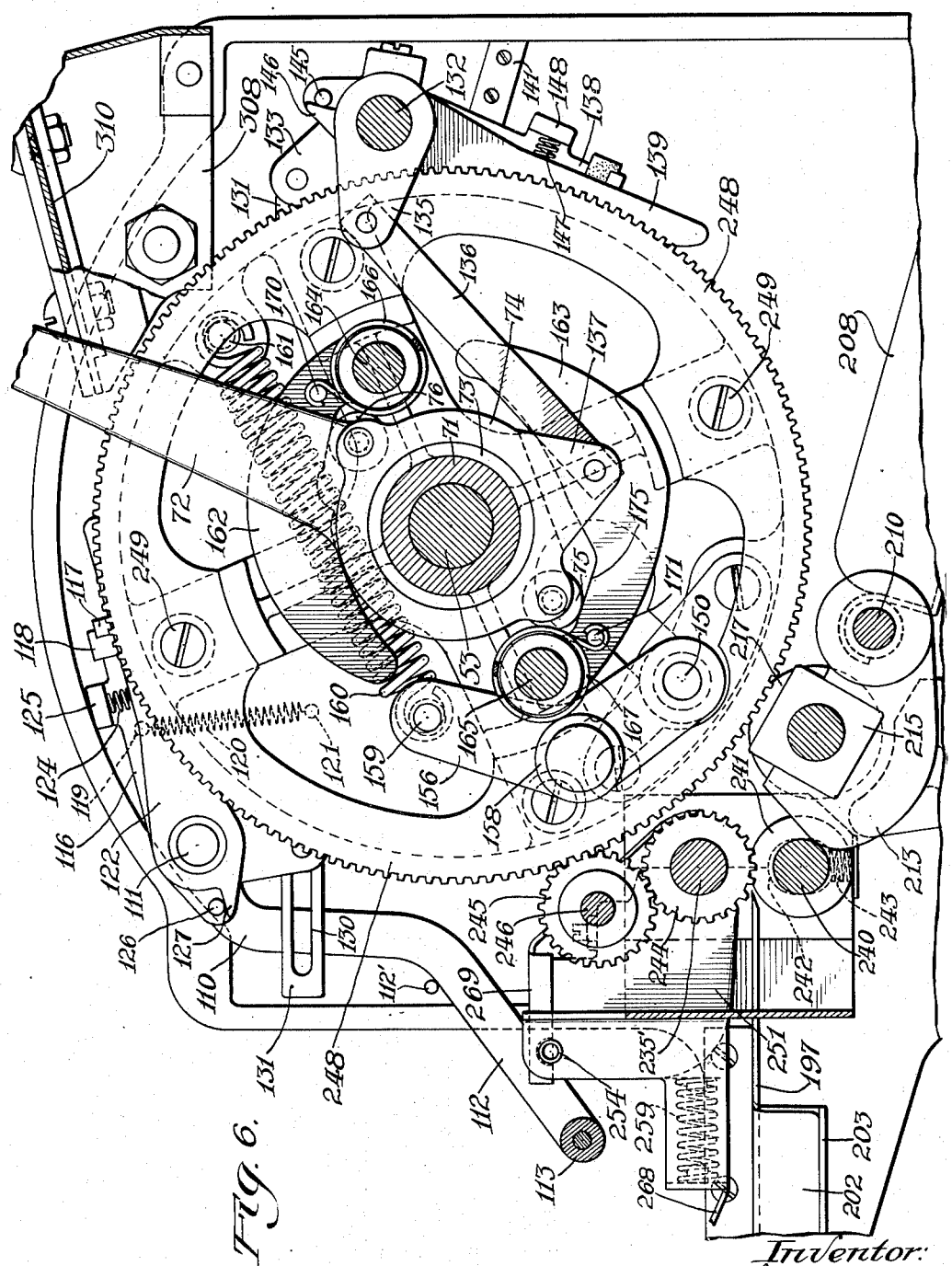
Fig. 6 is an enlarged sectional view taken on the line 6—6 of Fig. 1.
Figure 7:
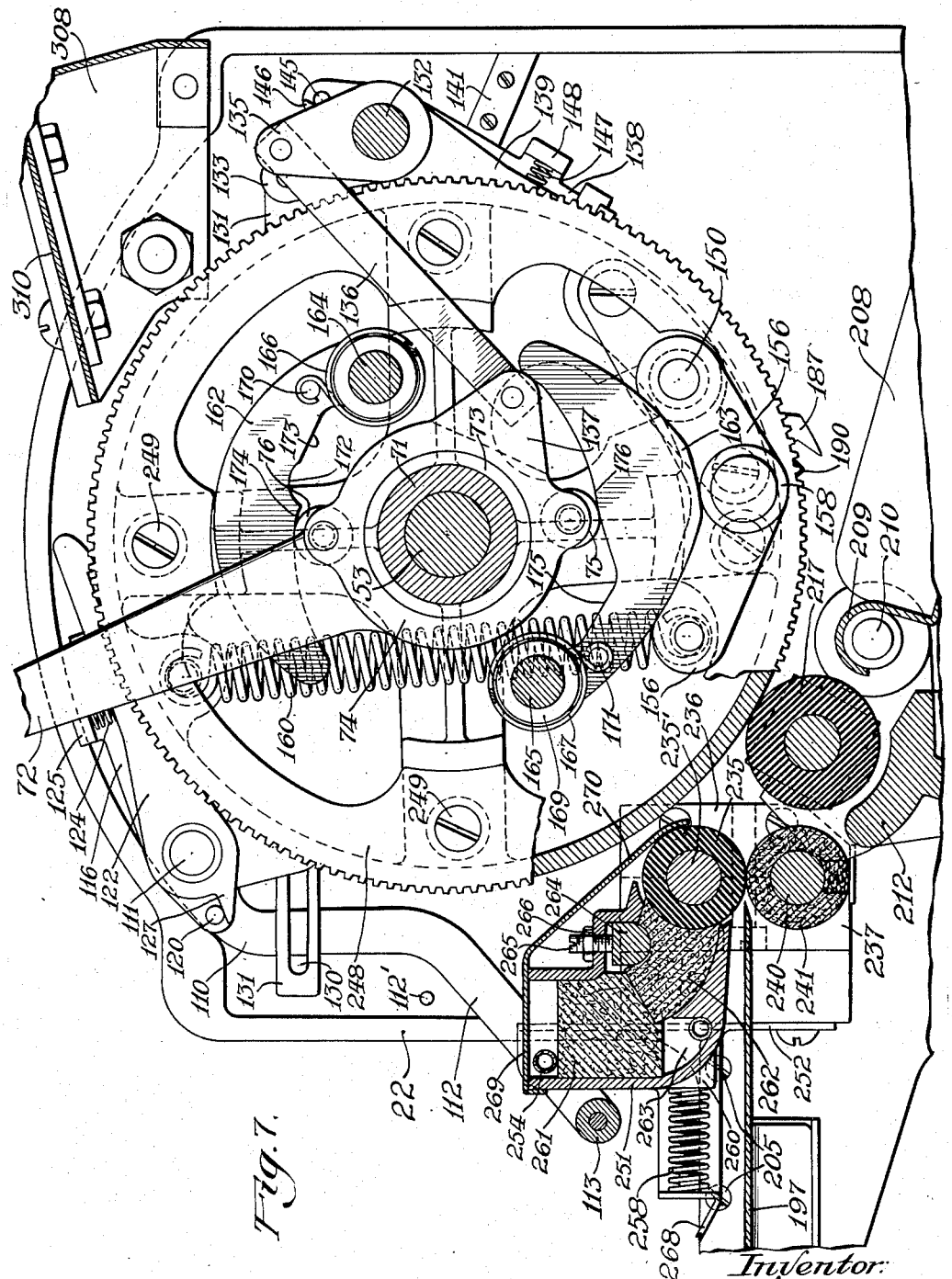
Fig. 7 is a sectional view similar to Fig. 6 showing the parts in a different position and with a portion of the moistening mechanism being broken away to show the interior construction thereof.

Referring now to Figs. 14 to 19, inclusive, the operation of the grippers 151 in response to the movement of the shaft 150 just described will be more clearly explained. Each gripper 151 is made up of a plurality of plates 177, 178, 179, 180, and 181 all secured together by means of a pin 182 which passes through the several plates. The plates 177, 178, 180, and 181 are provided with openings to receive the shaft 150, but the plate 179 which is in the middle is cut away as shown best in Fig. 18, and a pin 183 passes through the shaft 150 in position to abut the end of the plate 179 on the opposite sides of the shaft 150. The end of the plate 179 does not press solidly against the pin 183, but there is a slight amount of clearance as indicated at 184 between the plate 179 and the pin 183 which permits a limited amount of angular movement of the gripper unit on the shaft 150. As shown best in Fig. 19, the drum 54 is provided with a groove at 185 running lengthwise of the drum, the groove being substantially L-shaped in cross section, and at intervals along this groove openings 186 are cut in the drum for the gripper units 151 to project through. Each gripper plate of a unit has a gripping portion 187 which projects over a surface 188 of the groove 185, and the gripper plate 179 has an ejecting tooth 190 which projects out beyond the adjacent portions of the other plates into a slot 191 which is just wide enough for the tooth 190 to pass through. The gripper units 151 are arranged in pairs as shown in Fig. 3, and coiled springs 192 have their intermediate portions hooked over pins 193 secured in the shaft 150 with the free ends of the springs hooked over pins 194 and 195 fixed in the adjacent gripper units. Thus the springs 192 hold the grippers in clamping position to clamp a master sheet 196 against the surface 188 in the groove 185 as illustrated in Figs. 14 and 15. This is the normal resting position of the gripper units 151 and the shaft 150 and corresponds in position to the position of the lever 72 and its rollers 75 and 76 as illustrated in Fig. 6. When the lever 72 is moved to the position shown in Fig. 7, however, then the drum in rotating carries the roller 158 on arm 156 over the cam arm 163 while this cam arm is in raised position as illustrated in Fig. 7, and this moves the gripper units 151 out into the position shown in Fig. 16 against the force of the springs 192. It is evident from Fig. 16 that, in this position of the gripper units 151, the master sheet 196 is released from the holding portions 187 of the gripper units and is pressed outwardly by the ejector tooth 190 of each gripper unit. As the drum continues to rotate after the gripper units have been opened as shown in Fig. 16, the units are permitted to close back to the position shown in Fig 15 when the roller 158 moves off the raised outer surface of the cam arm 163. In the continued rotation of the drum carrying the gripper units around to the position shown in Fig. 17 which corresponds to the position shown in Fig. 8, the roller 158 on the arm 156 moves up on the outer surface of the cam arm 162, and this sufficiently rotates the shaft 150 to position the gripper units 151 in the position shown in Fig. 17 so that a fresh master sheet 196 may be inserted in the groove 185.

As pointed out hereinbefore in the description of the driving connections for the drum 54, the trip arm 116 and the latch arm 122 lock the drum stationary in the position shown in Fig. 11. This stationary position corresponds to the position of the mechanism shown in Fig. 6 and locates the grippers in the position shown in Figs. 2 and 14. When the trip arm 138 and the latch arm 139 on the shaft 132 are engaged with the block 104 and the shoulders 123 and the plate 99, as shown in Fig. 13, then the drum is in the position shown in Fig. 17, and the gripper operating mechanism is in the position shown in Fig. 8 so that the grippers are open ready to receive a fresh master sheet.

When the drum is locked in this latter position and it is desired to close the grippers on a fresh master sheet after inserting the same in the groove 185, then lever 72 is moved from its actuating position shown in Fig. 8 clockwise to the position shown in Fig. 6. This movement of the lever 72 permits the cam arm 162 to move inwardly away from the roller 158 of arm 156 and allows the gripper units 151 to be moved by their springs 192 into sheet gripping position. If there happens to be any unevenness in the thickness of the master sheet 196 or any dirt beneath it at any particular point where a gripper closes down upon it, the slight amount of play provided at 184 between the pin 183 in the shaft 150 and the end of the plate 179 permits sufficient yielding of that particular gripper to accommodate for the extra thickness without in any way preventing the other grippers from closing down tightly under the force of the springs 192. This makes it possible to grip two master sheets side by side even though the master sheets are of considerable difference in thickness.

The lever 72 in its clockwise movement from actuating position first moves the roller 76 into the recess 172 so that the grippers are free to close at this point before the movement of the lever 72 operates to release the trip arm 138 and the latch arm 139. The lever 72 can thus be utilized to open and close the gripper units 151 at will without releasing the drum 54 for further rotation.

When the lever 72 is positioned to place the roller 76 in the recess 172, this position also locates the roller 175 at the junction of the cam surfaces 175 and 176 of the cam arm 163. In this position of the lever 72, the shaft 132 is held by the link 136 in such a position as to hold the projection 143 away from the pin 140. This allows the spring 142 to hold the trip arm 138 in the stop position. Therefore, if the lever 72 is moved while the drum is rotating into a position to bring the roller 76 into the recess 172, the drum will be stopped by the trip arm 138. The gripper units 151, however, will not be opened unless the lever 72 is moved into the position shown in Fig. 7.

When the lever 72 is moved back to its resting position shown in Fig. 6, the arm 137 on the hub 74 of the lever 72 pulls down on the link 136 and the arm 135 on the shaft 132 to rotate this shaft and thus to release the trip arm 138 and the latch arm 139, permitting the pawl 96 to engage ratchet wheel 81 for further rotation of the drum. The link 131, which connects the arm 133 on the shaft 132 with the arm 128 on the operating lever 110, is released by the rotation of shaft 132, and the operating lever 110 returns to its normal stop position so as to stop the drum in the position shown in Fig. 11 and in Fig. 2 ready to have copy sheets fed to the drum.

The copy sheet feeding and moistening mechanism and its relation to the drum is best shown by Figs. 2, 7, 14, and 15.

The machine is provided with a copy sheet table 197 which is secured to a pair of projections 198 and 199 on the side frames 22 and 23, respectively, by means of removable pins 200 and 201 (see Fig. 1). The copy sheet table has its side edges turned down to provide flanges 202, one of which is shown in Fig. 2 and one of which is shown in Fig. 20. These side flanges rest upon angle irons 203 and 204 which project out from the portions 198 and 199 of the side frames 22 and 23 and are secured to these projections by screws indicated at 205 in Figs. 2, 6, and 7. The copy sheet table 197 has a stationary paper guide 206 at one side thereof and an adjustable paper guide 207 at the other side thereof for aligning bundles of copy sheets on the table.

A receiving or delivery tray 208 is mounted directly beneath the drum and has a hook portion 209 hooked over shaft 210 which is mounted on the side frame 22 of the machine. At its outer end, the delivery tray 208 is supported by a bracket 211 secured to the side frame. It is to be understood, of course, that the delivery tray 208 is supported on both sides of the machine in the same fashion. That is to say, there is a corresponding stub shaft 210' upon side frame 23, and the hook portion 209 of tray 208 hooks over the inner ends of both of these stub shafts.

The stub shafts 210 and 210' serve as pivots for a pressure roller supporting frame 212. This supporting frame extends across the machine and has at its opposite ends flanges 213 and 214 which flanges are provided with rectangular recesses to receive bearing blocks 215 and 216 that in turn support a pressure roller 217. The roller 217, which is preferably of rubber, is journalled to rotate in the bearing blocks 215 and 216 and may be adjusted toward and away from the drum 54 by swinging the frame 212 about its pivotal support on its shafts 210 and 210'.

For the purpose of adjusting the pressure roller, the frame 212 is provided with a depending arm 218 which is connected at its lower end to a rod 219. Lock nuts 220 limit the movement of the arm 218 in one direction on the rod 219, while a spring 221 on the rod 219 yieldingly opposes movement of the arm 218 in the other direction of the rod. Spring 221 is a comparatively heavy spring capable of maintaining the proper pressure on the pressure roller 217. The tension of the spring 221 may be varied by the adjustment provided by a nut 222 which is locked in place by a lock nut 223. A spring follower 224 is interposed between the arm 218 and the end of spring 221. The rod 219 is connected to a bearing member 225 (see Figs. 2 and 4) which is mounted on an eccentric 226 secured to a shaft 227 that is journalled at its opposite ends in the side frames 22 and 23. A groove 228 is provided in the eccentric 226, and a screw 229 in the bearing member 225 has a reduced end portion 230 extending into the groove so as to hold the bearing member on the eccentric. Adjacent the side frame 23, the shaft 227 has a collar 231 thereon which collar is provided with recesses such as 232. The recesses 232 cooperate with a spring pressed ball 233 carried on the bracket 26 to hold the shaft 227 in any adjusted position. A handle 234 is connected to the shaft 227 and lies outside the frame member 23. Thus by movement of the handle 234, shaft 227 can be rotated to adjust the position of the eccentric 226 and thereby increase or decrease the pressure of the pressure roller against the drum by moving arm 218 to swing the frame 212 about its mounting on the shafts 210 and 210'.

A combined feeding and moistening roller 235, which roller is preferably constructed of hard rubber is mounted on a shaft 235' and is journalled at its opposite ends in suitable bearing blocks 236 and 237 on the side frame 22 and 238 and 239 on the side frame 23. The bearing blocks 236 and 238 are secured direct to the side frames, and 237 and 239 are secured to them in the manner illustrated best in Fig. 7 by means of suitable screws. The bearing blocks just described also provide bearings for a shaft 240 of a combined feeding and absorbing roller 241. The roller 241 preferably is composed of a layer of felt encircling the shaft 240 so that it may absorb the excess moisture from the hard rubber roller 235. The shaft 240 has a limited amount of vertical movement in its bearing blocks as indicated at 242 in Figs. 6 and 13, and suitable springs 243 and 244 serve to urge the shaft 240 upwardly in its bearings to press the felt roller 241 against the moistening roller 235.

The felt roller 241 is driven entirely by frictional contact of its surface with the rubber roller 235 or a copy sheet interposed between them.

The rubber roller 235, however, is driven by a gear 244 secured at one end thereof on the shaft 235' of the moistening roller. The gear 244 meshes with a gear 245 which is mounted on a stub shaft 246 secured to a lug 247 which projects up from the bearing block 239 (see Figs. 1 and 6). The gear 245 meshes with a gear 248 which is secured to the end plate 79 of the drum 54 by suitable screws 249. Thus rotation of the drum drives the gear 248 which in turn drives the gear 245, and this gear drives the gear 244 to rotate the moistening roller 235.

The gears are so designed with respect to the circumferences of the drum 54 and the roller 235 as to give to the roller 235 about two per cent less surface speed of rotation than the surface speed of rotation of the drum 54. Thus a copy sheet such as 250, shown in Fig. 14, would be advanced by the rollers 235 and 241 at a slightly less rate of speed than the drum 54 travels. The moistened copy sheets are thus drawn taut between the point where they leave the feed rollers 235 and 241 and the point where they are held by the pressure roller 217 and the drum 54. The tension applied to the copy sheets in this manner is sufficient to prevent wrinkling of the moist copy sheets, but not sufficient to cause any rupture of the sheets. The gears 244, 245, and 248 are so connected, and the stop position of the drum is so located, that the movement of the drum from the position shown in Fig. 14 to the point where the gripper slot 185 passes under the pressure roller 217 causes sufficient rotation of the roller 235 to feed a copy sheet 250 from the position shown in Fig. 14 to the line of engagement between the pressure roller 217 and the drum 54.

Means are provided whereby the surface of the moistening roller 235 may be moistened with the proper amount of solvent for moistening the copy sheets 250. This means comprises a container 251 which is mounted at its opposite ends on brackets 252 and 253. The container 251 is supported upon the brackets 252 and 253 by means of a pipe 254 which passes through the bracket 253 and through the container 251 to project out through the bracket 252 at its opposite end. The pipe 254 is closed at the end where it passes through the bracket 252, but at its other end it is connected by a hose 255 to a suitable source of liquid solvent which will be described more fully hereinafter. The brackets 252 and 253 have rearwardly extending portions 256 and 257 which portions provide stops for a pair of springs 258 and 259 which springs at their other ends abut suitable lugs such as indicated at 260 on the container 251 to urge the container toward the moistening roller 235. The pipe 254 has a number of small perforations in it within the container 251 so that the solvent entering the container through this pipe will be discharged from the pipe. A suitable body 261 of absorbent material such as felt serves to spread the solvent discharged from the pipe 254, and a second body of felt 262 serves to conduct the solvent from the body 261 to the surface of the roller 235. The container 251 has a drain recess at 263 beneath the felt body 261 to avoid the accumulation of excess solvent within the container which would interfere with the proper feeding of solvent to the moistening roller 235.

For controlling the rate of flow of the solvent through the felt body 262, a pressure bar 264 is secured within the container 251 over the felt body 262 and supported by means of suitable screws such as indicated at 265 in Fig. 7, these screws being screw threaded into the wall of the container 251 so that they may be adjusted to raise and lower the bar 264. These screws may be locked in any adjusted position by means of lock nuts 266. Thus the rate of flow of the solvent fluid to the rubber roller 235 may be quite accurately gauged by varying the compression of the felt body 262. The brackets 252 and 253 also provide at their outer ends a pair of copy sheet guides 267 and 268 which extend outwardly and upwardly over the copy sheet table 197.

The receptacle 251 is closed by a suitable cover 269 which extends over the top of the container and has a portion 270 extending down over the moistening roller 235 to protect it from dust and the like. This cover, of course, may be removed whenever desired to permit access to the interior of the container 251.

The matter of supplying liquid to the moistening means consisting of the container 251, the felt bodies 261 and 262 and the moistening roller 235 is one of great importance in machines of this character. If too much liquid is supplied at a time, then too much moistening would naturally take place. If too little moisture is supplied, then the moistening roller 235 will fail to sufficiently moisten the copy sheets and poor copies will result. Furthermore, if the machine stands idle for any considerable length of time, the felt bodies dry out unless the fluid is kept turned on; and, if this is the case, then fluid is wasted because it continues to evaporate.

The present invention provides a means whereby a measured amount of fluid is supplied to the moistening means for each rotation of the drum. The invention further provides for initially charging the moistening means after the same has become dry without the necessity of rotating the drum and wasting copies.

This liquid feeding mechanism comprises a liquid receptacle 271 (see Figs. 20 and 21 and Fig. 4) which receptacle is mounted on suitable brackets 272 and 273 carried by members 25 and 26. The receptacle has therein a pump cylinder 274 provided with a piston 275 urged downwardly by a spring 276 and pulled upwardly by means of a piston rod 277 having a head 278 thereon. The interior of the cylinder communicates with the interior of the receptacle 271 by means of suitable openings 279 near the bottom of the receptacle 271 and spaced around the cylinder 274. The liquid is discharged from the cylinder 274 through an orifice 280 normally closed by a check valve 281. The fluid discharged is conducted by a pipe 282 upwardly to a venting chamber 283 which, as shown by Fig. 1, is mounted at one side of the machine just inside the side frame 23. The chamber 283 is a pressure relieving chamber which prevents the liquid from being discharged through the hose 255 and the pipe 254 with too great a force. This chamber is sufficiently large to take care of a single stroke of the pump without overflowing through a vent pipe 284 provided thereon and thus controls the fluid to such an extent that the only pressure upon the fluid when it flows into the pipe 254 is the pressure due to the drop in elevation from chamber 283 to the pipe 254, and this is relatively slight. If desired, the drain chamber 263 of container 251 may lead back to the receptacle 271 through a filling pipe 285, or the excess fluid may be drained off to any other point. The piston rod 277 is operated by a lever arm 286 which is bifurcated to engage under the head 278 and which is pivoted by means of a pin 287 to the side frame 23 of the machine.

A driving arm 288 is connected rigidly to the lever arm 286 to actuate the same. This driving arm is operated by the cam 69 which is fixed to the drum shaft 53 as shown in Fig. 3. The arm 288 has a roller 289 thereon which roller projects through an opening 290 in the side frame 23 and rides upon the cam 69. Thus each rotation of the cam 69 results in moving the arm 288 and lever 286 upwardly from the position shown in Fig. 20 to that shown in Fig. 21, and, as the cam moves again to the position shown in Fig. 20, the spring 276 forces the piston 275 downwardly to discharge the fluid which has entered the cylinder 274 through the openings 279.

The amount of fluid discharged for each stroke of the pump is regulated by limiting the downward movement of the piston 274 in response to the pressure of spring 276. This is accomplished by providing on the side frame 23 a regulating member comprising a shaft 291 having inside the frame 23 an eccentric 292 thereon which eccentric is adapted to engage the rear end portion 293 of lever 286 so as to limit the movement of this portion upwardly and thus limit the downward movement of the bifurcated end of lever 286 which holds the piston rod head 278 thereon. On the outside of the side frame 23, there is provided an adjusting knob 294 (see particularly Fig. 4). The shaft 291 is slidable endwise in the side frame 23, and a spring 295 is interposed between the eccentric 292 and the side frame 23 so as to normally hold the shaft in the position shown in Fig. 4. A number of openings 296, indicated most clearly in Fig. 5, are provided in the side frame 23, and a pin 297 is provided on the knob 294 for seating in these openings. Thus by pulling out on the knob 294 and turning it, the position of the eccentric 292 can be varied to vary the stroke of the piston 275 and thus the amount of liquid which will be pumped upon any stroke of the piston.

When the machine has been standing for a considerable length of time, sufficient to dry out the felt bodies 261 and 262, it would not function properly for some several rotations if it were started up without first supplying some of the solvent fluid to the container 251. In the present machine, means are provided whereby this can be readily done by merely operating the pump piston 275 by hand. For this purpose, an operating bar 298 is mounted on the side frame 23 by means of a slot 299 and a headed pin 300, the bar being guided by a suitable notch at 301 in a side flange 23' of the side frame. A roller 302 is carried on the inner end of the bar 298 for engaging against the backside of the arm 288. Thus, when the operator wishes to prime the machine by pumping enough solvent liquid into the container 251 to properly moisten the felt bodies therein, he merely grasps a handle 303 provided on the outer end of the bar 298 and pulls the bar out and releases it a few times to pump up the required amount of fluid.

As shown best in Fig. 3, the side frames 22 and 23 are provided with a pair of guards 304 and 305, respectively, in the form of sheet metal plates extending over the mechanism at the ends of the drum 54 so as to protect them from dust and dirt. The guard 305 has an opening at 306 for the hand lever 72.

The machine is provided with a master sheet guide table 307 shown best in Figs. 1 and 2. This guide table has side flanges such as 308 and 309 which are bolted to the side frames 22 and 23, respectively. This master sheet table, in order to permit ready access to the mechanism underneath it, has a hinged section 310 pivoted to the table 307 at 311 so that it can be raised up out of the way with no difficulty.

The operation of the machine, it is believed, will be evident from the foregoing description. It may be helpful, however, to have a complete statement of one operation of the device in a condensed form.

The machine when left after a number of copies have been made may be left in the position shown in Fig. 2. Now when an operator desires to use the machine again if an old master sheet has been left on the machine, he will naturally desire to remove this old sheet and place a fresh master sheet in position. Also, if the machine has been left standing for any length of time, he will need to see that the moistening mechanism is in proper condition to function.

By lifting the cover 269 of the moistening mechanism, the operator may see whether or not the felt pads 261 and 262 are moist. If the felt pads need more liquid, the operator operates the lever 298 a few times to cause the pump piston 275 to pump fluid through the pipe 282, chamber 283, hose 255, and pipe 254 into the container 251.

Next the operator, if he desires to place a new master sheet upon the machine, turns on the motor 27 and pulls the lever 72 toward the front of the machine to connect the pawl 96 to the ratchet wheel 81 by releasing the trip arm 116 and the latch arm 122. The movement of the lever 72 by the operator also sets the cam arm 163 in position to engage the roller 158 upon the arm 156 so that, as the roller 158 rides over the cam arm 163, the shaft 150 carrying the arm 156 and the grippers 151 will move the grippers outwardly to eject the used master sheet from the drum. As the drum continues to rotate, the roller 158 will move off of the cam arm 163 and ride up on the cam arm 162 to again open the grippers; and, when the drum has reached the position shown in Figs. 8 and 17, it will be stopped in this position by the engagement of the projection 96' of pawl 96 with the abutment 149 on the trip arm 138 (see Fig. 13). The abutment 149 also engages the shoulder 105 of the block 104, and the ratchet arm 139 drops into the recess 123 on the plate 99 to thus lock the drum against rotation. The operator may now insert a master sheet into the open grippers as shown in Fig. 17, utilizing the table 307 as a guide for the master sheet.

The operator may then return the lever 72 to its normal position which is that shown in Fig. 6, and this results in the release of the pawl 96 from the trip arm 138 and also the release of latch arm 139 from the plate 99. The pawl 96 is moved into engagement with the ratchet wheel 81 by the spring 102'. The return of the lever 72 has also, through the link 131 released the trip arm 116 and the latch arm 122 so that they are in position to stop the drum when the portion 96' of the pawl 96 arrives at the abutment 117 on the trip arm 116. During this part of the rotation of the drum 54, the gear 248 has, of course, driven the pinion 245 to cause rotation of the gear 244 on the shaft 235' of the moistening roller 235 so that the moistening roller and its associated felt roller 241 have been rotated sufficiently to wet the surface of the moistening roller by its engagement with the pad 262.

The machine is now ready for making copies so the operator may feed a copy sheet on the table 197 to the rollers 235 and 241. He then presses down upon the bar 113 to release the trip arm 116 and the latch arm 122 so that pawl 96 connects with the ratchet wheel 81 to start the drum 54 in rotation. The drum will complete one rotation and again be brought to a stop by engagement of the projection 96' of the pawl 96 with the abutment 17 on the trip arm 116. During this one rotation, the cam 69 on the drum shaft will move the arm 288 to cause a stroke of the pump piston 275 thus to supply a measured charge of fluid to the felt bodies in container 251. The making of copies can be continued by the operator by the mere insertion of fresh copies between the rollers 235 and 241 and the actuation of the bar 113 to release the drum. If the machine is left for a short time, it will remain in good condition because the moistening means will not dry out very quickly.

While certain embodiments of the invention have been shown and described, it is to be understood that it is capable of many modifications. Changes, therefore, in the construction and arrangement may be made without departing from the spirit and scope of the invention as disclosed in the appended claims in which it is the intention to claim all novelty inherent in the invention as broadly as possible in view of the prior art.

Having thus described the invention, what I claim as new and desire to secure by Letters Patent is:

1. A duplicating machine comprising a frame, a drum rotatable therein, gripping means to clamp a master sheet on said drum, a pressure roller for pressing copy sheets against the drum, power driven means for rotating said drum including a continuously driven member, a control device operable to secure the drum to said member for a single rotation of the drum and release the drum from said member, said device including means to lock the drum stationary in the same position after each rotation, and a second control device operable to connect the drum to said member for a part of a rotation of the drum, said second device including means to lock the drum in a different position after said connection.

2. In a duplicating machine, a rotatable drum, means to mount a master sheet on said drum, a pressure roller, a moistening device for moistening copy sheets to be fed between the pressure roller and the master sheet on the drum, and means to supply a measured charge of liquid to said moistening device upon each rotation of the drum, said last named means comprising a liquid receptacle, a pump connected to said receptacle to pump liquid therefrom, drive means for said pump, and a conduit from said pump to said moistening device, said conduit having a gas vent.

3. In a duplicating machine, a rotatable drum, means to mount a master sheet on said drum, a pressure roller, a moistening device for moistening copy sheets to be fed between the pressure roller and the master sheet on the drum, and means to supply a measured charge of liquid to said moistening device upon each rotation of the drum, said last named means comprising a liquid receptacle, a pump connected to said receptacle to pump liquid therefrom, drive means for said pump, and a conduit from said pump to said moistening device, said conduit having a pressure relieving chamber, and a gas vent.

4. In a duplicating machine, a rotatable drum, means to mount a master sheet on said drum, a pressure roller, a moistening device for moistening copy sheets to be fed between the pressure roller and the master sheet on the drum, and means to supply a measured charge of liquid to said moistening device upon each rotation of the drum, said last named means including a pump actuated by rotation of the drum, a liquid receptacle, and liquid conduits from said pump to said moistening device and said receptacle, and manually operable means for actuating said pump when the drum is at rest.

5. In a duplicating machine, a rotatable drum, means to mount a master sheet on said drum, a pressure roller, a moistening device for moistening copy sheets to be fed between the pressure roller and the master sheet on the drum, and means to supply a measured charge of liquid to said moistening device upon each rotation of the drum, said last named means including a pump actuated by rotation of the drum, a liquid receptacle, and liquid conduits from said pump to said moistening device and said receptacle, said moistening device including a container, an absorbent body therein, means for directing the liquid onto the top of said body, and said container having a hollow space provided with a drain below said body for removing excess liquid from the absorbent body.

6. In a duplicating machine, a rotatable drum, means to mount a master sheet on said drum, a pressure roller, a moistening device for moistening copy sheets to be fed between the pressure roller and the master sheet on the drum, and means to supply a measured charge of liquid to said moistening device upon each rotation of the drum, said moistening device including a container, an absorbent body therein, means for directing the liquid onto the top of said body, and said container having a hollow space beneath said body provided with a drain opening for removing excess liquid from the absorbent body, said container having a side opening and a moistening roller at said side opening, the absorbent body being in contact with said roller at said opening said drain opening being lower than the level of said side opening.

7. In a duplicating machine, a rotatable drum, means to mount a master sheet on said drum, a pressure roller, a moistening device for moistening copy sheets to be fed between the pressure roller and the master sheet on the drum, and means to supply a measured charge of liquid to said moistening device upon each rotation of the drum, said moistening device including a container, an absorbent body therein, means for directing the liquid onto the top of said body, and said container having a drain below said body for removing excess liquid from the absorbent body, said container having a side opening and a moistening roller at said side opening, the absorbent body being in contact with said roller at said opening, and a cover for said container having a shield extending over said roller.

8. In a duplicating machine, a rotatable drum, means to mount a master sheet on said drum, a pressure roller, a moistening device for moistening copy sheets to be fed between the pressure roller and the master sheet on the drum, and means to supply a measured charge of liquid to said moistening device upon each rotation of the drum, said moistening device including a container, an absorbent body therein, means for directing the liquid onto the top of said body, and said container having a drain below said body for removing excess liquid from the absorbent body, said container having a side opening and a moistening roller at said side opening, the absorbent body being in contact with said roller at said opening, said container having adjustable means adjacent said open side to compress a portion of said absorbent body.

9. A duplicating machine comprising a frame, a drum rotatable therein, gripping means to clamp a master sheet on said drum, a pressure roller for pressing copy sheets against the drum, power driven means for rotating said drum including a continuously driven member, a control device operable to secure the drum to said member for a single rotation of the drum and release the drum from said member, said device including means to lock the drum stationary in the same position after each rotation, and a second control device operable to connect the drum to said member for a part of a rotation of the drum, said second device including means to lock the drum in a different position after said connection, said second control device also comprising mechanism operable to cause release of said gripping means upon connection of the drum to said member.

10. A duplicating machine comprising a frame, an impression drum rotatably journalled in said frame, gripping means to clamp a master sheet on said drum, means to press copy sheets against a master sheet clamped on said drum, a moistening device for said copy sheets, means to rotate said drum, a first means operable to lock said drum against movement in a definite position upon the completion of each duplicating cycle, a second means interconnected with said first means and adapted when actuated to hold said first means in inoperative position and to lock said drum in a second position.

11. A duplicating machine comprising a frame, an impression drum rotatably journalled in said frame, gripping means to clamp a master sheet on said drum, means to press copy sheets against a master sheet clamped on said drum, a moistening device for said copy sheets, means to rotate said drum, a first means operable to lock said drum against movement in a definite position upon the completion of each duplicating cycle, a second means interconnected with said first means and adapted when actuated to hold said first means in inoperative position and to lock said drum in a second position, said gripping means being controlled by said second means.

12. A duplicating machine comprising a frame, an impression drum rotatably journalled in said frame, gripping means to clamp a master sheet on said drum, means to press copy sheets against a master sheet clamped on said drum, a moistening device for said copy sheets, means to rotate said drum, a first means operable to lock said drum against movement in a definite position upon the completion of each duplicating cycle, a second means interconnected with said first means and adapted when actuated to hold said first means in inoperative position and to lock said drum in a second position, the means to rotate said drum including a pawl on said drum which cooperates with said first and second means in stopping said drum.

13. In a duplicating machine, a frame, a drum rotatably journalled therein, gripping means carried by said drum for securing a master sheet thereon, said drum having a groove therein to receive an edge of a master sheet, said gripping means comprising a shaft journalled in said drum, said drum having openings therein spaced along said groove, grippers carried by said shaft and projecting through said openings to clamp said edge of the master sheet in said groove, and means to rock said shaft, each of said grippers having a clamping portion for pressing a master sheet against one wall of the groove and an ejecting portion smaller than the clamp portion for pushing the master sheet away from said wall, said wall being cut away to receive the ejecting portion when the gripper closes.

14. In a duplicating machine, a frame, a drum rotatably journalled therein, gripping means carried by said drum for securing a master sheet thereon, said drum having a groove therein to receive an edge of a master sheet, and said gripping means having means for ejecting said edge of the master sheet from the groove in the drum, power driven means to rotate said drum, and control means for said gripping means and drum adapted when actuated to release the gripping means and eject the master sheet from the groove while the drum is rotating, said control means including mechanism to thereafter stop the drum and hold the gripping means in open position to permit the insertion of a master sheet in said groove.

15. In a duplicating machine, an impression drum, said drum having an L-shaped groove in its surface running lengthwise of the drum, said drum also having openings therein intersecting said groove, a shaft within said drum, grippers mounted on said shaft and projecting through said openings and movable against one wall of said groove, each gripper having an ejecting portion underlying said wall, and said wall having slots therein for said ejecting portions.

16. A duplicating machine comprising a frame, an impression drum rotatable in said frame, gripping means to clamp a master sheet on said drum, means to press copy sheets against a master sheet clamped on said drum, means to supply a solvent for the ink on said master sheet, means to rotate said drum, a first means operable to secure said drum against movement in a definite position upon completion of each duplicating cycle, a second means interconnected with said first means adapted when actuated to lock said drum in a second position, said second means being movable to open and close said gripping means while holding said drum in said second position.

17. A duplicating machine comprising a frame, a drum rotatably mounted therein, gripping means to clamp a master sheet on said drum, a pressure roller for pressing copy sheets against the drum, manual control means for said gripping means operable to open and close said gripping means while the drum is stationary, said manual control means including mechanism locking the drum in stationary position while the gripping means is being opened and closed, said mechanism being interconnected with the gripping means whereby to prevent movement of the drum while the gripping means is open.

18. A duplicating machine comprising a frame, a duplicating drum rotatable therein, means for securing to said drum a member carrying data to be duplicated, a pressure roller for pressing copy sheets against said member, power driven means for rotating said drum including a continuously driven member, a control device operable to secure the drum to said continuously driven member for a single rotation of the drum and then release the drum from said continuously driven member, said device including means to lock the drum stationary in the same position after each rotation, and a second control device operable to connect the drum to said continuously driven member for a part of a revolution of the drum, said second device including means to lock the drum in a different position after said connection.

19. A duplicating machine comprising a frame, a duplicating drum rotatable therein, means for securing to said drum a member carrying data to be duplicated, a pressure roller for pressing copy sheets against said member, power driven means for rotating said drum including a continuously driven member, a control device operable to secure the drum to said continuously driven member for a single rotation of the drum and then release the drum from said continuously driven member, said device including means to stop the drum stationary in the same position after each rotation, and a second control device operable to connect the drum to said continuously driven member for a part of a revolution of the drum, said second device including means to stop the drum in a different position after said connection.

JOHN W. HERNLUND.